United States Patent [19]
Ichinose et al.

[11] Patent Number: 5,904,876
[45] Date of Patent: May 18, 1999

[54] NEMATIC LIQUID-CRYSTAL COMPOSITION

[75] Inventors: Hideo Ichinose, Odawara; Tomoya Yano, Atsugi, both of Japan

[73] Assignees: Sony Corporation, Tokyo, Japan; Merck Patent Gesellschaft mit beschrankter Haftung, Darmstadt, Germany

[21] Appl. No.: 08/981,289

[22] PCT Filed: Jun. 10, 1996

[86] PCT No.: PCT/EP96/02516

§ 371 Date: Dec. 22, 1997

§ 102(e) Date: Dec. 22, 1997

[87] PCT Pub. No.: WO97/00924

PCT Pub. Date: Jan. 9, 1997

[30]     Foreign Application Priority Data

Jun. 23, 1995  [EP]  European Pat. Off. .............. 95109802

[51] Int. Cl.⁶ .......................... C09K 19/52; C09K 19/30; C09K 19/20

[52] U.S. Cl. ................. 252/299.01; 252/299.63; 252/299.67

[58] Field of Search .................. 252/299.01, 299.63, 252/299.67

[56]            References Cited

U.S. PATENT DOCUMENTS 5,414,440   5/1995   Ilcisin et al. .............................. 345/58

FOREIGN PATENT DOCUMENTS

| | | |
|---|---|---|
| 548318 | 6/1993 | European Pat. Off. . |
| 4123389 | 1/1993 | Germany . |
| 6-251718 | 9/1994 | Japan . |
| 7-325285 | 12/1995 | Japan . |

*Primary Examiner*—Shean C. Wu
*Attorney, Agent, or Firm*—Millen, White, Zelano & Branigan, P.C.

[57]            ABSTRACT

The invention relates to a nematic liquid-crystal composition based on terminally and laterally fluorinated compounds and dielectrically neutral compounds. This composition is highly useful for plasma-addressed display devices.

11 Claims, No Drawings

NEMATIC LIQUID-CRYSTAL COMPOSITION

The invention relates to a nematic liquid-crystal composition based on terminally and laterally fluorinated compounds and dielectrically neutral compounds. This composition is especially useful for plasma-addressed display devices.

Plasma-addressed displays (PAD) are highly favored for commercially interesting displays with a high information content. Such PADs are used for TV application and also for displays with high information content for computer terminals, automobiles and aeroplanes.

PADs have electrical switching elements, a plasma cell associated with the display cell with a plurality of addressing channels.

Such PADs are disclosed for example in EP 0 628 944, EP 0 545 569, U.S. Pat No. 4,896,149 and U.S. Pat. No. 5,077,553.

In PADs the switching elements are addressed in a multiplex scheme. So they charge the electrodes of a pixel in the limited time they are active. Then they become inactive until they are addressed again in the next cycle. Consequently the change of the voltage on a plasma addressed pixel is a nondesired but a very decisive feature of such a display. The discharge of the electrodes of the pixel and resistivity of the dielectric material between the electrodes, namely the liquid crystal.

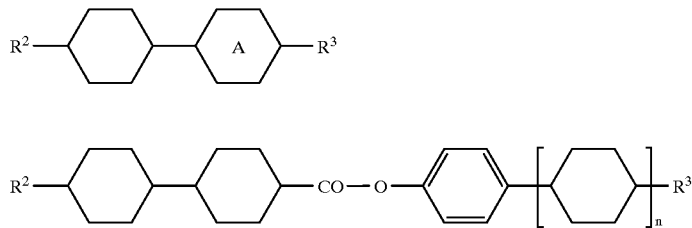

Conventional liquid crystalline materials for active matrix displays are not suitable for PADs, since they have to high values of birefringence and dielectric anisotropy.

There is thus still a great need for liquid-crystal composition having a high resistivity and other suitable material properties for use in PADs such as a broad nematic mesophase range with an extremely low transition temperature smectic-nematic and no crystallization at low temperature.

The invention has for its object to provide a liquid-crystal composition with a very high resistivity which meets also the other demands.

In addition, most of the conventional liquid-crystalline compositions for AMD applications have a birefringence Δn Δn>0.08. There is a demand for compositions with low values of Δn, preferably with Δn<0.07 and viscosities of <20 mm s$^{-1}$ at 20° C.

It has now been found that a nematic liquid-crystal composition comprising:

15 to 35% by weight of two or more compounds selected from group 1 consisting of

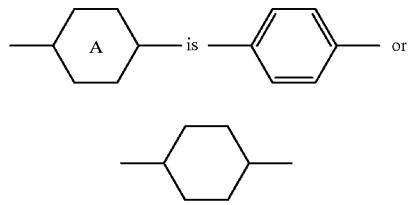

in which $R^1$ is a straight-chain alkyl group of 1 to 5 carbon atoms, $L^1$ and $L^2$ are H or F, X is F, $OCF_2H$ oder $OCF_3$, and m is 0 or 1, 65 to 85% by weight of at least three compound from group 2 selected from:

2a

2b in which $R^2$ and $R^3$ are each independently a straight-chain alkyl or alkoxy group of 1 to 5 carbon atoms, n is 0 or 1.

is highly suited for PAD application. Very high RC time values can be obtained in PADs. These compositions also show a reduced viscosity, allow operation in AMDs in the first minimum of transmission and do not exhibit any crystallization at −30° C.

The inventive LC compositions exhibit a dielectric anisotropy of less than 4.0, preferably between 1.0 and 3.0 in particular 1.5 to 2.5. The clearing point of the compositions according to the invention is higher than 85° C. in particular higher than 90° C.

Such compositions preferably contain two, three or four compounds from group 1. Preferred compositions comprise more than 20% by weight of one or more compounds from group 1.

The compounds from group 1 are known from the European Patent Applns. 0 387 032 and 0 280 902, the European Patents 0 051 738 and 0 125 653, the International Patent Applications WO 89/02884 and WO 85/048874 and U.S. Pat. No. 4,302,352, U.S. Pat. No. 4,710,315 and U.S. Pat. No. 4,419,264 or can be prepared in analogy to known compounds.

The compounds from group 2 are known for example from DE 33 21 373, DE 28 00 553 and DE 32 06 269.

Preferred compositions also comprise one or more compounds from group 0 having two rings:

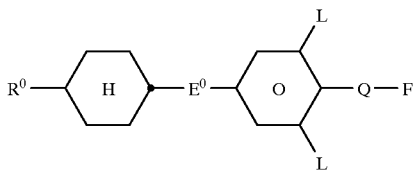

where $R^0$ denotes a straight-chain alkyl group of 2 to 7 carbon atoms, $E^0$ is —(CH$_2$)$_{4-}$, —(CH$_2$)$_{2-}$, —CO—O— or a single bond an L and Q are as defined in group 3. Preferably $E^0$ is —(CH$_2$)$_2$ or a single bond, Q is a single bond and one of L is H and the other L is H or F.

The compositions according to this invention preferably comprise 20 to 30% by weight and especially 25 to 30% by weight of components from group 1. The preferred weight percent ranges for the other groups (if present) are as follows:

group 0: 5 to 15%, especially 5 to 10%
group 2: 65 to 85%, especially 70 to 80%

Preferably the components from groups 0, 1 and 2 from the basis of the claimed compositions and constitute at least 70% (preferably at least 80%) by weight of the compositions. It is, however, also possible to use besides components from groups 0 to 3 also other LC components in smaller percentages for fine-tuning the claimed compositions.

As a rule the composition consists of 8 to 20, in particular 10 to 17 mesogenic compounds selected from the groups 0, 1 and 2.

The preparation of the compositions according to the invention is effected in the conventional manner. In general, the desired amount of the components which is used in the smaller amount is dissolved in the components which constitutes the main constituent, preferably at elevated temperature. If this temperature is chosen to be above the clearing point of the main constituent, the completeness of the process of dissolving can be observed ved particularly easily.

However, it is also possible to mix solutions of the components in a suitable organic solvent, for example acetone, chloroform or methanol, and to remove the solvent after thorough mixing, for example by distillation under reduced pressure. It is self-evident that with this method it must be ensured that the solvent does not introduce any contaminants or undesirable dopants.

By means of suitable additives the liquid crystal phases according to the invention can be modified in such a way that they can be used in any hitherto disclosed kind of PAD.

The examples below serve to illustrate the invention without limiting it. In the examples, the melting point and clear point of a liquid crystal sub- stance are given in degrees Celsius. The percentages are by weight.

EXAMPLE 1

A liquid-crystal composition consisting of
14% of trans, trans-4-propyl4'-methoxy bicyclohexane
13% of trans, trans4-propyl4'-propoxy bicyclohexane
13% of trans, trans4-pentyl4'-methoxy bicyclohexane
5% of 1-2-(3,4-difluorophenyl)-ethane
5 % of 1 -[trans-4-(trans4-pentylcyclohexyl)-cyclohexyl]-2-(3,4- difluorophenyl)-ethane
7% of 4-(trans4-propylcyclohexyl)-methoxybenzene
3% of 4-(trans4-propylcyclohexyl)-ethoxybenzene
5% of (4-propyiphenyl) 4'-propylbicyclohexy l4-ylcarboxylate
5% of (4-propylphenyl) 4'-butylbicyclohexyl4-ylcarboxylate
4% of 4'-propylbicyclohexyl4-ylcarboxylate
4% of 4'-propylbicyclohexyl4-ylcarboxylate
4% of 4'-propylbicyclohexyl4-ylcarboxylate
6% of 5-1,2,3-trifluoro-benzene
6% of 5-1,2,3-trifluoro-benzene
6% of 5-1,2,3-trifluoro-benzene This composition exhibits the following properties:

| | |
|---|---|
| S → N | <-30° C. |
| N → I | +93° C. |
| V (20° C.) | 17 mm$^2$/S |
| V (0° C.) | 51 mm$^2$/S |
| V (-30° C.) | 673 mm$^2$/S |
| Δn | 0.0668 |
| Δε | +1.9 |

We claim:

1. A nematic liquid-crystal composition comprising:

15 to 35% by weight of two or more compounds selected from group 1 consisting of compounds of the formulae 1a and 1b:

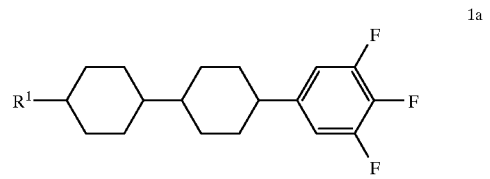

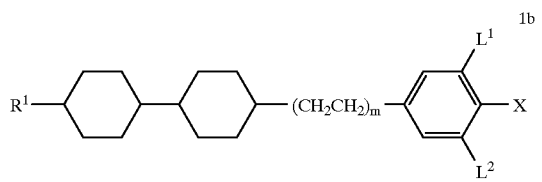

in which $R^1$ is a straight-chain alkyl group of 1 to 5 carbon atoms,

X is F, OCF$_2$H or OCF$_3$ and m is 0 or 1, and $L^1$ and $L^2$ are each independently H or F, provided that at least one compound of the formula 1a is contained in the composition and at least one compound of the formula 1b wherein $L^1$ is H and X is F is contained in the composition, and 65 to 85% by weight of at least four compounds from group 2 consisting of compounds of the formulae 2a and 2b

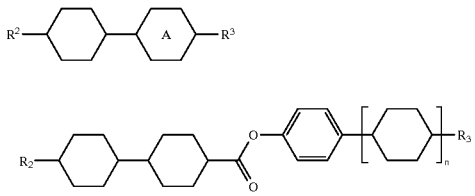

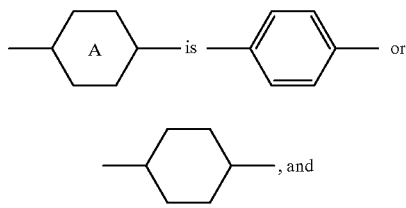

in which

R$^2$ and R$^3$ are each independently a straight-chain alkyl or alkoxy group of 1 to 5 carbon atoms,

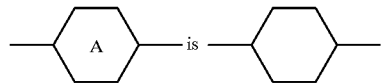

n is 0 or 1.
provided that:
  at least one compound of formula 2a, in which

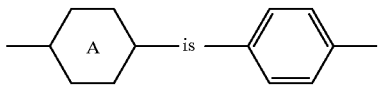

at least one compound of formula 2a, in which

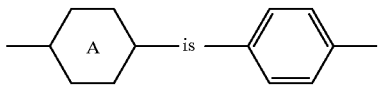

at least one compound of formula 2b, in which n is 0, and at least one compound of formula 2b, in which n is 1, are contained in the composition.

2. Plasma-addressed display device comprising a nematic liquid-crystal composition according to claim 1.

3. The composition of claim 1, which has a birefringence, Δn, less than 0.07.

4. The composition of claim 1, which has a viscosity of less than 20 mm s$^{-1}$ at 20° C.

5. The composition of claim 1, which has a dielectric anisotropy, Δε, of less than 4.0.

6. The composition of claim 1, which has a dielectric anisotropy, Δε, of from 1.0 to 3.0.

7. The composition of claim 1, which has a clearing point of higher than 85° C.

8. The composition of claim 1, which further comprises one or more compounds of the group 0:

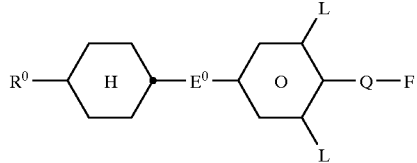

where R$^0$ denotes a straight-chain alkyl group of 2 to 7 carbon atoms, E$^0$ is —(CH$_2$)$_{4-}$, —(CH$_2$)$_{2-}$, —CO—O— or a single bond; Q is a single bond; and one of L is H and the other L is H or F.

9. The composition of claim 8, wherein the one or more compounds of the group 0 are provided in an amount of 5 to 15% by weight in the composition.

10. The composition of claim 1, wherein the compounds of group 1 are provided m an amount of 20 to 30% by weight in the composition and the compounds of group 2 are provided in an amount of 70 to 80% by weight in the composition.

11. The composition of claim 8 which comprises 8 to 20 mesogenic compounds from groups 0, 1 and 2.

* * * * *